United States Patent [19]
Kalivas

[11] 4,084,824
[45] Apr. 18, 1978

[54] DEVICE TO ASSIST IN HOLDING A PLAYING RECORD TO CLEAN THE SAME AND THE METHOD OF USING THE SAME

[76] Inventor: Christopher G. Kalivas, 104 Pine Neck Ave., East Patchogue, N.Y. 11772

[21] Appl. No.: 711,653
[22] Filed: Aug. 4, 1976
[51] Int. Cl.$^2$ ............................ G11B 3/58; B65G 7/12
[52] U.S. Cl. ..................... 274/1 R; 274/47; 294/25
[58] Field of Search .................... 274/1 R, 47; 294/25

[56] References Cited
U.S. PATENT DOCUMENTS

| 1,160,522 | 11/1915 | Morris | 294/25 |
| 2,151,846 | 3/1939 | Greneker | 294/25 |
| 2,935,354 | 5/1960 | Chapman | 294/25 |
| 3,282,589 | 11/1966 | Morrison | 274/1 R |

*Primary Examiner*—Steven L. Stephan
*Attorney, Agent, or Firm*—Nolte and Nolte

[57] ABSTRACT

A device to assist in holding a playing record in the form of a thumb cover providing at its closed end a hook element for insertion into the center hole of a playing record, thus facilitating the holding of the record between the hook element and the opposed ends of the remaining fingers of the hand to dispose the record for cleaning the same with the other hand; and the method of using the device.

1 Claim, 4 Drawing Figures

DEVICE TO ASSIST IN HOLDING A PLAYING RECORD TO CLEAN THE SAME AND THE METHOD OF USING THE SAME

BACKGROUND OF THE INVENTION

While the best way to clean a record is to apply a good record cleanser to the grooved surface with a rag, because this method results in excessive handling and thus smudging, many devices have been suggested to hold and clean the record. As far as is known, all such devices still require excessive handling of the record after cleaning or are cumbersome to use or expensive to make. See, for instance, U.S. Pat. Nos. 1,102, 073; 1,261,688; 2,938,732; 2,977,127 and 3,472,517. In all events, the record should not be cleaned while in position on a turntable as this method of cleaning records is abusive, especially to the highly sensitive equipment currently being used to play long-playing records.

THE INVENTION

The present invention provides a cover sized for a snug fit on the thumb. The thumb cover provides a record retainer part in the form of a hook element at its closed end which is inserted into the center hole of a record, leaving the other digits of the hand free to press upon the circumferential edge of the record to firmly hold the record between the fingers and the hook element. The record can then be cleaned in any acceptable manner without smudging the same or in any manner leaving residue from the hand. The record can then be placed upon the turntable.

Similarly, the record can be lifted from the turntable by lifting the same with the fingers at the outer edge of the record until the same is free of the record pin, at which time the hook element of the thumb cover can again be inserted into the center hole of the record whereupon the record can be placed into is album jacket.

DESCRIPTION OF THE DRAWINGS

In the accompanying drawings:

In FIG. 1, a human hand 10 is shown outstretched and on the thumb is disposed a thumb cover 11 having at its closed end an integrally formed hook element 12.

As shown in FIG. 2, the thumb cover may be made of a flexible plastic material or rubber and preferably of a size which can fit a range of thunb sizes because of its flexibility.

Alternatively, the thumb cover may be made of a rigid material with the inner surface tapering outwardly to form a conical like surface providing a snug fit for various sized thumbs therealong.

The hook element may be radially displaced from the axis of the thumb, as shown, to accommodate a wider spread between the hook element and opposed fingers.

Figure 1:
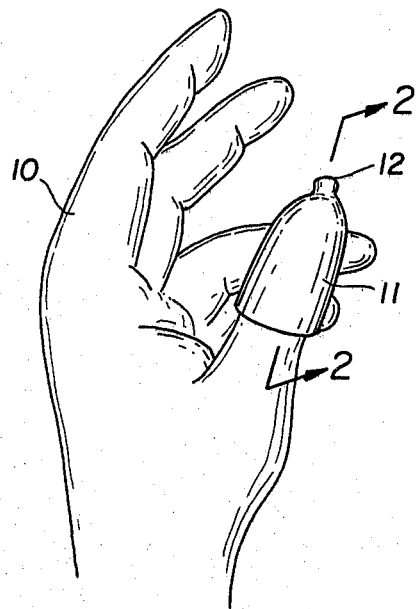
FIG. 1 is an perspective view showing one form of the record retainer of the invention in place upon a human hand.
Figure 2:
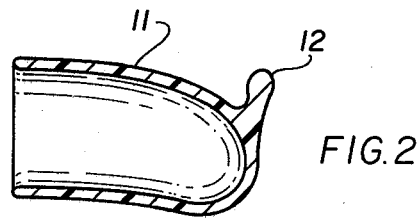
FIG. 2 is a sectional view of the retainer only taken along the lines 2—2 of FIG. 1.
Figure 3:
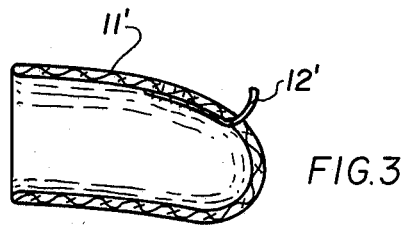
FIG. 3 is a sectional view similar to FIG. 2, but showing a modification of the invention in a record retainer.

FIG. 3 shows a modification of the invention in which the thumb cover 11' is made of fabric and in which the hook element 12' is sewn into the inner side of the thumb cover.

Figure 4:
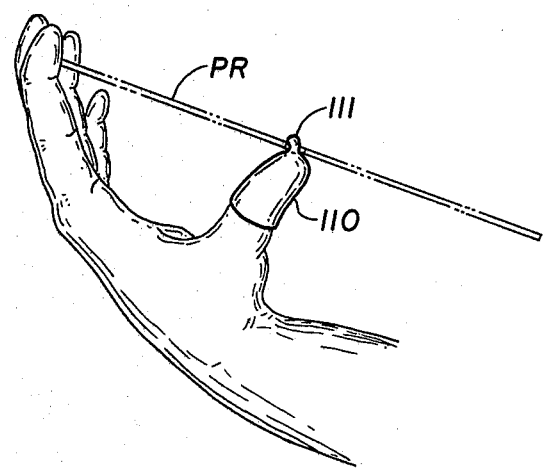
FIG. 4 is another perspective view of the retainer of the invention in use.

FIG. 4 shows a playing record PR held between the hook element at 111 of a retainer 110 and the juxtaposed ends of the remaining digits of the hand.

While the invention is disclosed in the form of a thumb cover, it is to be understood that the record retainer need only clamp onto or otherwise be secured to the end of a thumb to perform its record retaining function.

Other modifications of the present invention will occur to those skilled in the art, including the provision of the thumb cover-hook element combination in which the thumb cover may be rolled onto the thumb as would be the case if the cover were made of a flexible elastic material rolled into an annulus prior to fitting upon the thumb.

The retainer may be fabricated in semi-regid-flexible plastic or rubber by any number of known molding techniques which may dictate the placement of the hook element differently than disposed radially of the axis of the thumb, as shown. Furthermore, the hook element may take different forms, such as that utilized in "poppet" jewelry of a spherical part sized, however, to just fit into and be removable from the center hole of the record.

In any event, the invention should only be restricted as now claimed.

What is claimed is:

1. A method of cleaning a playing record utilizing a playing record retainer which retainer comprises means constituted for securing the same to the end of the thumb, said means including means extending from an end thereof for insertion into the center hole of a playing record for retaining the record by pressure exerted by the hand of the holder between said retaining means and the remaining digits of the hand juxtaposed to said retaining means at the circumferential edge of the record, said method comprising the steps of placing the retainer on the thumb of one hand, inserting the insertion and retaining means into the center hole of a playing record and grasping the record by placing the remaining digits of the hand around the circumferential edge of the record, and exerting pressure between the remaining digits and the insertion means, then cleaning the record.

* * * * *